Patented Aug. 8, 1944

2,355,310

UNITED STATES PATENT OFFICE 2,355,310

PETROLEUM SULPHONATE DERIVATIVES

Leo Liberthson, New York, N. Y., assignor to L. Sonneborn Sons, Inc., a corporation of Delaware No Drawing. Application May 12, 1943,
Serial No. 486,743

12 Claims. (Cl. 260—556)

This invention relates to new and useful petroleum sulphonate derivatives, and this application is a continuation in part of my application Serial No. 393,944 filed May 17, 1941.

In the acid refining of lubricating oil distillates, the crude stocks are usually treated with concentrated sulphuric acid and preferably fuming sulphuric acid in the well-known manner to yield a two layer system comprising an oil layer and an acid sludge layer. The acid treatment, being carried out under sulphonating conditions of acid amount and temperature, results in the formation of so-called petroleum sulphonic acids, that are generally of two types; one, the so-called mahogany petroleum sulphonic acids, which, due to their oil soluble character, are found in the oil layer, and two, the green petroleum sulphonic acids, primarily of a water soluble nature, found dissolved in the sludge. These sulphonic acids are recovered after suitable extraction and purification from the respective layers, either as such or in the form of their salts, i. e., petroleum sulphonates, in accordance with well-known practices.

In accordance with the invention described and claimed in my co-pending application Serial No. 344,918, filed July 11, 1940, an alkylene or polyalkylene polyamine having at least once the grouping

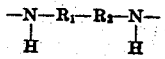

in which $R_1$ and $R_2$ may be any alkylene or aralkylene radical, is reacted with a suitable petroleum sulphonic acid. The reaction is essentially one of neutralization of the polyamino base with the sulphonic acid. The reagents are preferably used in amounts sufficient to provide one sulphonic acid group for each of at least two of the amino groups present in the polyamine. In most cases, however, the preferred practice is to provide for each amino group present in the polyamine at least one sulphonic acid group. It will generally suffice to establish the molecular weight of the particular petroleum sulphonic acid used in the reaction, such as by a sulphur determination, and to react the polyamine and the sulphonic acid in substantially stoichiometric proportions.

Typical mahogany and green sulphonic acids may be produced in accordance with conventional procedures as for instance set forth in the following example:

Example I

A lubricating oil stock from a Mid-Continent crude or a raffinate of such crude is treated with successive batches of fuming sulphuric acid at a temperature maintained below approximately 130° F., the mixture being agitated after the addition of each batch and permitted to stratify into an oil layer and sludge layer, each sludge layer being drawn off before the addition of the next succeeding batch of acid. The total acid added was approximately 20% by volume of the oil treated. The combined oil layers are then thoroughly agitated with about 50% by volume of a 50% aqueous ethyl alcohol and then allowed to settle. After stratification has been completed, the aqueous alcohol layer is withdrawn and counter-extracted with a light petroleum distillate such as benzene, in order to remove entrained oil. The oil-free 50% alcoholic solution is then distilled, preferably in vacuo, to remove the alcohol and water, obtaining as a residue substantially oil free mahogany sulphonic acids.

The combined acid sludges are diluted with a medium heavy petroleum distillate which after agitation and stratification is drawn off and which may be further extracted with 50% aqueous ethyl alcohol to recover entrained mahogany sulphonic acids.

The combined acid sludges are diluted with water to approximately 15° Bé. concentration, thoroughly boiled and permitted to settle. After stratification the bulk of the sulphuric acid is removed with the withdrawl of the lower layer leaving an aqueous solution of the petroleum green sulphonic acids. The aqueous solution of the green petroleum sulphonic acids is extracted with chloroform and the extract, after separation from the aqueous media is freed from the solvent by vacuum distillation.

The alkylene or polyalkylene polyamines that may be used as set forth in my said co-pending application, are represented by the following general formula:

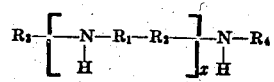

in which $R_1$ and $R_2$ are any alkylene or aralkylene radical and $R_3$ and $R_4$ any hydrogen, alkyl, aryl or aralkyl radical and in which $x$, being at least one in number, designates the number of

members in the polyamino chain. Suitable alkylene or polyalkylene polyamines are, for instance, ethylene diamine, diethylene triamine, triethylene tetramine, tetraethylene pentamine, or any alkyl, aryl, or aralkyl derivatives thereof.

In the practical application the polyamine and the petroleum sulphonic acid are brought into intimate contact with one another so as to effect a reaction between the same. In most cases it will suffice to intimately mix the reagents without the aid of solvents and the reaction will proceed at normal temperatures. If necessary slightly raised temperatures may be resorted to. In many cases, however, the reaction between the reagents will proceed more satisfactorily if one or the other of them or both are present in the form of a suitable solution in a given solvent, which solvent is preferably such that the resulting sulphonate product is substantially insoluble therein. The neutralization reaction may thus, for instance, be obtained with the polyamine added to the petroleum sulphonic acid while the latter is in suitable solution. If a mahogany petroleum sulphonic acid, for instance, is used, a solvent, such as xylol, may serve this purpose, whereas if a green petroleum sulphonic acid is used, water or alcohol are satisfactory. Alternatively, when using mahogany petroleum sulphonic acids, it is preferred to use a suitable oil as the solvent for the sulphonic acid. Such procedure offers the particular advantage that it is possible to use directly the oil layer obtained in the acid refining of a lubricating oil distillate and containing the mahogany sulphonic acids in solution, thus substantially eliminating the necessity for extraction or isolation of these acids.

When using within the preferred procedure an oil containing mahogany sulphonic acid the same is preferably substantially freed from inorganic acidity by air blowing and settling, and thereafter admixed with the polyamine. The mahogany sulphonic acid dissolved in the oil will react with the polyamine to form the polyamino sulphonate.

When in accordance with the preferred practice, use is made of a solution of mahogany sulphonic acid in oil, the addition of the polyamine may be accomplished in different ways. The same may be added to the solution of the sulphonic acid in oil as such, i. e., without prior solution in a suitable solvent, or in the form of a solution in a solvent such as water, alcohol or the like. If the polyamine is added as such, it is preferred to effect the addition in excess of stoichiometrical amounts as this will facilitate the precipitation of the reaction product with the sulphonic acid which otherwise would have to be accomplished with the aid of centrifugal separation. If, on the other hand, the polyamine is added in solution, it is not necessary as a rule to add in excess of stoichiometrical amounts for the accomplishment of a satisfactory and rapid precipitation of the sulphonate product. When the polyamine is added in excess of stoichiometrical amounts, this excess is as a rule carried to a considerable extent into the settled or precipitated polyamino petroleum sulphonate from which it may be recovered if desired by suitable extraction with, for instance, alcohol or water.

When I speak of "stoichiometrical" or "neutralizing" amounts, or use such similar expressions, I mean thereby such amounts of reagents that there is present one molecule of petroleum sulphonic acid (a mono-sulphonic acid) for every NH or NH₂ group per molecule of polyalkalene polyamine.

The polyamino sulphonates obtained in accordance with the invention set forth in my said co-pending application possess preferably at least once the grouping

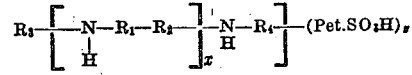

in which $R_1$ and $R_2$ may be any alkylene or aralkylene radical, and Pet.SO₃H a petroleum sulphonic acid and constitute preferably polysulphonates of the general formula

in which $R_1$ and $R_2$ are any alkylene or aralkylene radical and $R_3$ and $R_4$ any hydrogen, alkyl, aryl or aralkyl radical in which $x$, being at least one in number, designates the number of

—NH—$R_1$—$R_2$— .

members in the polyamino sulphonate chain and in which $y$ designates the number of petroleum sulphonic acid groups present in the polyamine. It is preferred to substantially neutralize the polyamine in which case $y$ equals $x+1$, i. e., there is at least one Pet.SO₃H group present for each reactive NH in the polyamino sulphonate molecule.

The polyamino sulphonates are substantially insoluble in aqueous or alcoholic media as well as in petroleum hydrocarbons. They are substantially soluble in aromatic solvents, such as benzol and its homologues, halogenated hydrocarbons, such as chloroform, and in higher aliphatic esters, such as amyl acetate. If the reaction between the polyamine and the sulphonic acid is effected in the presence of a solvent in which the resulting polyamino sulphonate is substantially insoluble, which constitutes the preferred practice in accordance with my invention, the polyamino sulphonate is precipitated and the precipitate may be recovered by decantation, followed if necessary, or desired, by a suitable washing of the precipitate. When a solvent solution is used in which the resulting polyamino sulphonate is substantially soluble, the latter may be recovered by removal of the solvent preferably in vacuo.

In making the polyamino green sulphonates it is preferable to first isolate the green acids from the acid sludge. This may be done in a conventional manner alternative to that set forth in Example I by neutralizing the acid sludge, extracting the green sulphonates with alcohol, distilling off the alcohol and then regenerating the green acids by the exact amount of acid necessary, settling out the salts, removing the layer of green acids and then reacting the latter with the desired amount of polyamine and preferably with stoichiometric amounts.

As the number of amino groups in the polyamino sulphonate increases, solvent solutions of the compounds increase in viscosity. Thus a 30% xylol solution of the reaction products of diethylene triamine and green sulphonic acid has a viscosity of about 35@210° F. while a xylol solution of the same concentration of the reaction products of the green acids and triethylene tetramine has a viscosity of 48@210° F., while the viscosity of a solution of the same solution of the tetraethylene pentamine green sulphonate has a viscosity of about 58@210° F.

Within the broad purview of this invention a dehydration of the afore-described polyamino petroleum sulphonates may be accomplished, yielding valuable products of a resinous character. For this purpose the polyamino petroleum sulphonates are heated to dehydrating temperatures, i. e., temperatures sufficiently high to split off water from their molecular structure. In most cases it is preferred to heat at a temperature above approximately 250° F. and below the temperature at which decomposition of the polyamino petroleum sulphonate occurs, i. e., the temperature at which evolution of ammonia becomes noticeable. In general temperatures between 250° F. and 320° F. suffice. The heating is preferably carried out under dehydrating conditions, i. e., for a period of time sufficient to yield at a given dehydration temperature or temperature range a substantially constant weight, indicating that substantially all of the intra molecular water desired to be removed has been driven off. The period of heating is to some extent dependent upon the number of sulphonic groups present in the sulphonate, as these determine the amount of water to be removed from the product; the heating may thus require from 1 to 4 hours or more. Analyses of the dehydrated polyamino petroleum sulphonates, in accordance with the invention, for sulphur and nitrogen, agreed substantially with the theoretical calculated sulphur and nitrogen content. Determinations of the water produced in the dehydration reactions substantially agreed with the theoretically calculated amounts of water produced in intra molecular dehydrations from each amino petroleum sulphonate group present.

Alternatively, the intra molecular dehydration may be accomplished by dissolving the polyamino petroleum sulphonate in a suitable solvent having a relatively high boiling point and to reflux, preferably with a water trap arrangement, the sulphonate solution until the dehydration reaction is complete. The boiling point of such solvent is preferably in excess of 250° F. and below the decomposition temperature of the polyamino petroleum sulphonate, i. e., the temperature at which evolution of ammonia occurs. A suitable solvent for such purpose is, for instance, xylol having a boiling point of approximately 285° F. When proceeding in this manner, the temperature at which the dehydration reaction takes place is as a general rule lower than is the case when dry-heating the product. It is preferred to select such solvent for the solvent dehydration procedure as will not appreciably dissolve the dehydration product upon the formation thereof. Such solvent may be one in which the petroleum polyalkylene polyamino sulphonate product is substantially insoluble or in which such product can be maintained in suspension. Such latter solvent, is for instance, kerosene of an initial boiling point of approximately 300° F. and an end point of approximately 450° F.

When a polyamino mahogany sulphonate product is obtained by precipitation from a mahogany acid containing oil, as previously described, the precipitate will as a rule contain approximately its own weight of occluded oil. If desired, this occluded oil may be removed by suitable extraction from the polyamino sulphonate before the dehydration is carried out. In many cases, however, it is of advantage to subject the polyamino sulphonate product together with its content of occluded oil to the dehydration reaction. The then resulting product, though in most respects substantially identical with the product obtained by the dehydration of the sulphonate in the absence of occluded oil, particularly with regard to appearance, film forming tendency, etc., is yet in other respects different. The same possesses, for instance, a modified, usually lower melting point and constitutes a much more plastic and softer product than is otherwise the case.

The dehydrated polyamino sulphonates in accordance with the invention have highly desirable characteristics and properties.

The mahogany sulphonic acid derived products, while fused, are capable of being converted to transparent sheets which, upon cooling, resemble dry varnish films; they are thermo plastic and capable of being drawn out into long threads and possess definite fusing temperatures and sharp cooling curves; thus, for example, the sulphonamide obtained by dehydrating a diethylene triamine mahogany sulphonate shows a fusing point of approximately 160 to 170° F., while the triethylene tetramine mahogany sulphonamide and the tetraethylene pentamine sulphonamide possess fusing points of approximately 185° F. to 190° F. and 220° F. to 230° F. respectively (A. S. T. M. ball and ring method). The polyamino mahogany sulphonamides when added to other resins or products with which they are compatible as, for example, rosin, estergum, cumar, and certain modified phenolic resins will impart plasticity thereto.

In contrast to the plastic masses obtained from petroleum mahogany polysulphonamides, the petroleum green polysulphonamides are dark, brittle solids, soluble in coal tar hydrocarbons, halogenated hydrocarbons and higher esters. The solutions obtained yield black coatings similar to asphalt but the films lack elasticity. The petroleum green polysulphonamides are, however, compatible with the petroleum mahogany polysulphonamides so that the latter may serve as plasticizers for the former.

The following examples are furnished by way of illustration:

*Example II*

1212 parts by weight of mahogany sulphonic acids derived from the sulphonation of a 95 viscosity (at 100° F.) raffinate are dissolved in xylol. 103 parts by weight of diethylene triamine (molecular weight 103) are added to the xylol solution with gentle stirring. The xylol is then removed by distillation in vacuo.

The diethylene triamine mahogany sulphonate obtained is then heated at a temperature between 250° F. and 320° F. until no further weight decrease can be observed. The resulting product is thermo-plastic and capable of being drawn out into long threads and shows a fusing point of approximately 160 to 170° F. (A. S. T. M. ball and ring method).

*Example III*

A triethylene tetramine mahogany sulphonate was obtained following the procedure specified in Example II using 146 parts by weight of triethylene tetramine (molecular weight 146) and 1616 parts by weight of the mahogany acid.

The triethylene tetramine mahogany sulphonate was then suspended in a kerosene of an initial boiling point of approximately 300° F. and an end point of approximately 450° F. and the solution refluxed using the conventional water trap element; the sulphonamide formed being insoluble in the kerosene precipitate. The precipitate is filtered and dried constituting as analytically ascertained, a triethylene tetramine mahogany sulphonamide, thermoplastic in nature, capable of being drawn into long threads and possessing a fusing point of approximately 185° to 190° F. (A. S. T. M. ball and ring method).

Example IV

A solution of mahogany sulphonic acids in petroleum hydrocarbon oil constituting the oil layer obtained in the fuming sulphuric acid treatment of a 95 viscosity (100° F.) raffinate was freed from inorganic activity by air blowing and settling. A sufficient amount of the purified oil layer to correspond to an ascertained mahogany sulphonic acid content of approximately 2020 parts by weight was admixed with gentle stirring with 189 parts by weight of tetraethylene pentamine. After completion of the neutralization reaction, the mix was centrifuged and the oil layer withdrawn. The resulting tetraethylene pentamine mahogany sulphonate was freed from occluded oil by alcohol extraction and then further treated for the production of the sulphonamide in accordance with the procedure set forth in Example III. The resulting tetraethylene pentamine mahogany sulphonamide is thermoplastic in nature, capable of being drawn out into long threads and possesses a fusing point of approximately 220 to 230° F. (A. S. T. M. ball and ring method).

Example V 720 parts by weight of petroleum green sulphonic acids derived from the acid sludge obtained in the fuming sulphuric acid refining of a lubricating stock from a Mid-Continent crude petroleum are dissolved in alcohol and the alcoholic solution admixed with 60 parts by weight (molecular weight 60) of ethylene diamine with stirring. The ethylene diamine mahogany sulphonate was precipitated and the precipitate recovered by decantation following by washing with alcohol.

The ethylene diamine green petroleum sulphonate was then heated to a temperature between 250 and 320° F. until constancy of weight was obtained. The resulting ethylene diamine green petroleum sulphonamide constituted a dark brittle product soluble in coal tar hydrocarbons, halogenated hydrocarbons and higher esters.

Example VI 1224 parts by weight of an aqueous solution of green sulphonic acids of the type used in the preceding example were admixed with 146 parts by weight of triethylene tetramine (molecular weight 146) with agitation and slight raising of the temperature. Upon completion of the neutralization reaction, the precipitate was recovered after decantation of the supernatant liquid and washed with alcohol.

The resulting triethylene tetramine green petroleum sulphonate was then converted to the sulphonamide as described in the preceding example.

Where in the specification and claims reference is made to the term "petroleum sulphonic acid" or where an expression of similar import is used, it is intended to designate thereby generically any one or more or mixture of sulphonic acids (of the lubricating oil distillate hydrocarbon range, as, for instance,) derived from the acid refining of a lubricating oil distillate under sulphonating conditions.

The foregoing description is for purposes of illustration and not of limitation, and the same is not to be limited except by the appended claims in which I have endeavored to claim broadly all inherent novelty.

I claim:
1. A petroleum sulphonamide which essentially comprises an intramolecular dehydration product of a petroleum sulphonic acid salt of a polyalkylene polyamine.

2. A petroleum sulphonamide which essentially comprises an intramolecular dehydration product of a petroleum mahogany sulphonic acid salt of a polyalkylene polyamine.

3. A petroleum sulphonamide which essentially comprises an intramolecular dehydration product of a petroleum green sulphonic acid salt of a polyalkylene polyamine.

4. A petroleum sulphonamide which essentially comprises an intramolecular dehydration product of a petroleum sulphonic acid salt of a diethylene triamine.

5. A petroleum sulphonamide which essentially comprises an intramolecular dehydration product of a petroleum sulphonic acid salt of a triethylene tetramine.

6. A petroleum sulphonamide which essentially comprises an intramolecular dehydration product of a petroleum sulphonic acid salt of a tetraethylene pentamine.

7. A petroleum sulphonamide which essentially comprises an intramolecular dehydration product of a petroleum sulphonic acid salt of a polyalkylene polyamine containing occluded petroleum hydrocarbon oil.

8. Method of producing a petroleum sulphonamide which comprises heating a petroleum sulphonic acid salt of a polyalkylene polyamine under intramolecular dehydrating conditions to a temperature above 250° F. and below the decomposition temperature of said salt.

9. Method of producing a petroleum sulphonamide in accordance with claim 8 in which said petroleum sulphonic acid salt is heated in the presence of a petroleum hydrocarbon oil.

10. Method of producing a petroleum sulphonamide in accordance with claim 8 in which said petroleum sulphonic acid salt is heated while substantially in solution in a solvent therefor.

11. Method of producing a petroleum sulphonamide in accordance with claim 8 in which said petroleum sulphonic acid salt is heated substantially under reflux conditions while substantially dissolved in a solvent therefor, said solvent having a boiling point in excess of 250° F. and below the temperature of decomposition of said petroleum sulphonic acid salt.

12. Method of producing a petroleum sulphonamide in accordance with claim 8 in which the petroleum sulphonic acid radical of said petroleum sulphonic acid salt is a member selected from the group consisting of mahogany petroleum sulphonic acid and green petroleum sulphonic acid radicals, in which the polyalkylene polyamine radical of said petroleum sulphonic acid salt is a member selected from the group consisting of ethylene diamine, diethylene triamine, triethylene tetramine and tetraethylene pentamine radicals and in which said petroleum sulphonic acid salt is heated substantially under reflux conditions while substantially dissolved in a solvent therefor, said solvent having a boiling point in excess of 250° F. and below the temperature of decomposition of said petroleum sulphonate.

LEO LIBERTHSON.